US011275819B2

(12) United States Patent
Kursun

(10) Patent No.: US 11,275,819 B2
(45) Date of Patent: Mar. 15, 2022

(54) GENERATIVE ADVERSARIAL NETWORK TRAINING AND FEATURE EXTRACTION FOR BIOMETRIC AUTHENTICATION

(71) Applicant: Bank of America Corporation, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 658 days.

(21) Appl. No.: 16/210,427

(22) Filed: Dec. 5, 2018

(65) Prior Publication Data

US 2020/0184053 A1 Jun. 11, 2020

(51) Int. Cl.
*G06F 21/32* (2013.01)
*G06F 21/57* (2013.01)
(Continued)

(52) U.S. Cl.
CPC .......... *G06F 21/32* (2013.01); *G06F 16/9535* (2019.01); *G06F 21/577* (2013.01);
(Continued)

(58) Field of Classification Search
CPC .... G06F 21/32; G06F 21/577; G06F 16/9535; G06F 2221/034; G06F 21/45; G06N 3/08;
(Continued)

(56) References Cited

U.S. PATENT DOCUMENTS 5,450,504 A 9/1995 Calia
5,715,325 A 2/1998 Bang et al.
(Continued)

FOREIGN PATENT DOCUMENTS

CN 102682309 A 9/2012
CN 105095829 A 11/2015
(Continued)

OTHER PUBLICATIONS

Patil et al., Assessing Vulnerability of Dorsal Hand-Vein Verification System to Spoofing Attacks using Smartphone Camera, Mar. 2016, IEEE International Conference on Identity, Security and Behavior Analysis, pp. 1-6 (Year: 2016).*
(Continued)

*Primary Examiner* — Kenneth W Chang
(74) *Attorney, Agent, or Firm* — Moore & Van Allen PLLC; Thomas R. Parker, II

(57) ABSTRACT

Embodiments of the present invention provide a system for generative adversarial network training and feature extraction for biometric authentication. The system collects electronic biometric data of a user from one or more data sources, and stores the collected electronic biometric data as a biometric user account for the user in a personal NoSQL database library associated with the user. A generative adversarial neural network system then determines improved biometric feature selection and improved model refinements for existing biometric authentication models based on the biometric account for the user in the personal library associated with the user. The system can then determine user exposure levels for different authentication channels, including certain biometric authentication channels. A custom adversarial strategy for general adversarial network attacks is then established based on the user exposure levels to generate a biometric authentication process that is more accurate and secure.

19 Claims, 7 Drawing Sheets

(51) Int. Cl.
*G06F 16/9535* (2019.01)
*G06N 3/08* (2006.01)
*G06K 9/00* (2022.01)

(52) U.S. Cl.
CPC ........... *G06K 9/00926* (2013.01); *G06N 3/08* (2013.01); *G06F 2221/034* (2013.01)

(58) Field of Classification Search
CPC ............... G06N 3/0472; G06N 3/0454; G06K 9/00926; G06K 9/00899; G06K 9/627
See application file for complete search history.

(56) References Cited

U.S. PATENT DOCUMENTS

| | | | |
|---|---|---|---|
| 5,781,650 | A | 7/1998 | Lobo et al. |
| 5,859,921 | A | 1/1999 | Suzuki |
| 6,184,926 | B1 | 2/2001 | Khosravi et al. |
| 6,251,891 | B1 | 6/2001 | Nakagawa et al. |
| 6,307,954 | B1 | 10/2001 | Suzaki |
| 6,885,760 | B2 | 4/2005 | Yamada et al. |
| 7,391,900 | B2 | 6/2008 | Kim et al. |
| 7,542,591 | B2 | 6/2009 | Li |
| 2002/0085771 | A1 | 7/2002 | Sakuramoto |
| 2003/0039380 | A1 | 2/2003 | Sukegawa et al. |
| 2004/0240708 | A1 | 12/2004 | Hu et al. |
| 2005/0105780 | A1 | 5/2005 | Ioffe |
| 2005/0190963 | A1 | 9/2005 | Li |
| 2007/0177793 | A1 | 8/2007 | Gu |
| 2009/0287930 | A1* | 11/2009 | Nagaraja ................... H04L 9/08 713/171 |
| 2009/0307764 | A1* | 12/2009 | Isobe .................... H04L 9/3231 726/7 |
| 2010/0061600 | A1* | 3/2010 | Niinuma .............. G06K 9/0012 382/115 |
| 2018/0181794 | A1* | 6/2018 | Benini ............... G06K 9/00228 |
| 2018/0232508 | A1* | 8/2018 | Kursun ................. G06F 21/316 |
| 2019/0114469 | A1* | 4/2019 | Sartor ................ G06K 9/00255 |

FOREIGN PATENT DOCUMENTS

| | | |
|---|---|---|
| CN | 107292813 A | 10/2017 |
| CN | 107862270 A | 3/2018 |

OTHER PUBLICATIONS

Seo et al., GIDS: GAN based Intrusion Detection System for In-Vehicle Network, Aug. 2018, 16th Annual Conference on Privacy, Security and Trust, pp. 1-6 (Year: 2018).*

Kohli et al., Synthetic Iris Presentation Attack using iDCGAN, Oct. 2017, IEEE International Joint Conference on Biometrics, pp. 674-680 (Year: 2017).*

\* cited by examiner

GENERATIVE ADVERSARIAL NETWORK TRAINING AND FEATURE EXTRACTION FOR BIOMETRIC AUTHENTICATION

BACKGROUND

Biometric authentication solutions provide improved security over standard username, personal identification number, and password-based solutions, as these standard authentication solutions may be identified and extracted if exposed. Instead, biometric authentication solutions are more complex and can be combined in multi-modal biometric authentication steps such as face recognition, voice or speech recognition, gait, behavioral biometrics, and the like.

However, malfeasant actors are developing techniques to target the current generation of biometric solutions by compiling publicly available data of people (e.g., images, videos, voice recordings, and the like) to create three dimensional models of those people that are then enriched with gestures that are then used to deceive biometric authentication systems. Therefore, a need exists for a more robust biometric authentication system with generative adversarial network training and feature extraction to provide a higher accuracy and security in biometric authentication practices.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for generative adversarial network training and feature extraction for biometric authentication. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve collecting electronic biometric data of a user from one or more data sources comprising social media systems, third party vendor systems, systems of known exposed data, and public information space systems, wherein the electronic biometric data of the user comprises at least one of image data, video data, and voice recording data associated with the user. The system may then store the collected electronic biometric data of the user as a biometric account for the user in a personal library associated with the user, wherein the personal library associated with the user comprises a real-time NoSQL database.

Once the personal library storing the electronic biometric data of the user has been created, the system may consolidate the database by identify one or more inconsistencies in the stored electronic biometric data of the user; removing the identified one or more inconsistencies in the stored electronic biometric data of the user from the personal library, and then consolidating the stored electronic biometric data of the user within the personal library associated with the user, without the identified one or more inconsistencies. The system may additionally or alternatively dynamically update the stored electronic biometric data of the user within the personal library associated with the user in real time in response to determining that new or adjusted electronic biometric data of the user is available from the one or more data sources.

They system may then cause a generative adversarial neural network system to determine improved biometric feature selection and improved model refinements for existing biometric authentication models based on the biometric account for the user in the personal library associated with the user. The system can then determine, based on the improved feature selection and the improved model refinements for the existing biometric authentication models, user exposure levels for one or more biometric authentication channels, combinations of biometric authentication channels, and/or combinations of non-biometric and biometric authentication channels. Next, the system may establish a custom adversarial strategy for generative adversarial network ("GAN") attacks based on the determined user exposure levels for the one or more biometric authentication channels, combinations of biometric authentication channels, and/or combinations of non-biometric and biometric authentication channels.

The system may establish the custom adversarial strategy for GAN attacks in a number of ways. For example, the system may change the existing biometric authentication models comprising improved model refinements as determined by the generative adversarial neural network system by requiring a biometric authentication action involving traditionally or previously unexposed biometric features or scenarios. Additionally or alternatively the system establishes the custom adversarial strategy by changing the existing biometric authentication models comprising improved model refinements as determined by the generative adversarial neural network system by requiring a randomly selected authentication action involving changed biometric authentication conditions or interaction patterns. In other embodiments, the system may establish a custom adversarial strategy for GAN attacks by changing weighted values of at least one of the one or more biometric authentication channels, and/or changing weighted values of at least one of the existing biometric authentication models comprising improved model refinements as determined by the generative adversarial neural network system. In some embodiments, the system may establish the custom adversarial strategy for GAN attacks by adding one or more additional authentication methods to the existing biometric authentication models comprising improved model refinements as determined by the generative adversarial neural network system, and/or requiring a stepped up level of authentication from existing authentication models. Finally, in some embodiments, the system may establish a custom adversarial strategy for GAN attacks by determining whether received biometric authentication data from an individual purporting to be the user matches a data pattern present within a custom database of known GAN attack data.

Once the custom adversarial strategy for the generative adversarial network has been established, the system may identify previous biometric authentication sessions for the user from a historical user database, where the previous biometric authentication sessions involved the existing biometric authentication models without the improved model refinements. The system may then evaluate received biometric authentication data of the user for each of the previous biometric authentication sessions for the user based on the custom adversarial strategy for GAN attacks to identify potential exposures from previously unknown GAN attacks. In response to identifying a first previous biometric authentication session that is associated with a previously unknown GAN attack, the system may tag the received biometric authentication data of the user for that first previous biometric authentication session as being associated with imitability and exposure metrics.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
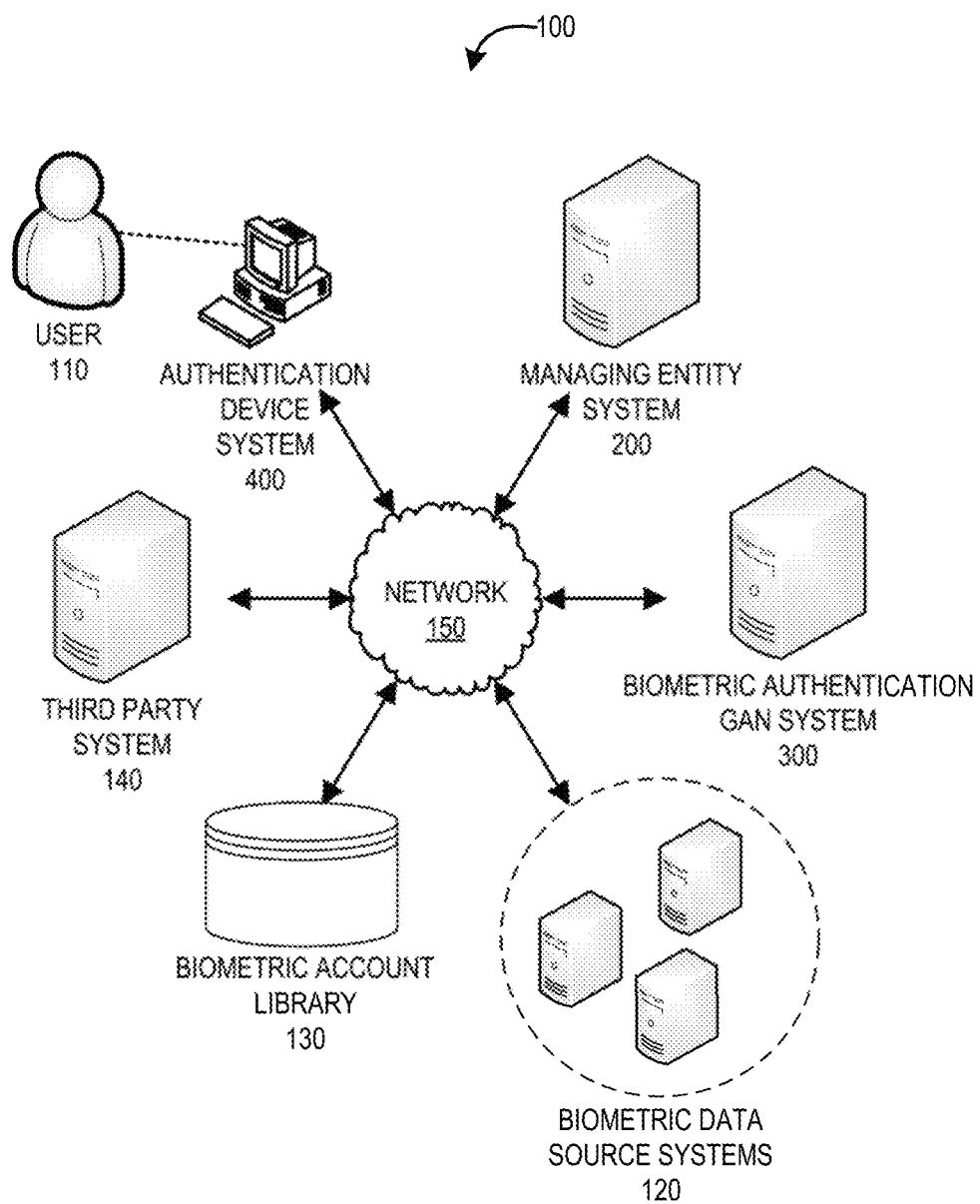
Figure 2:
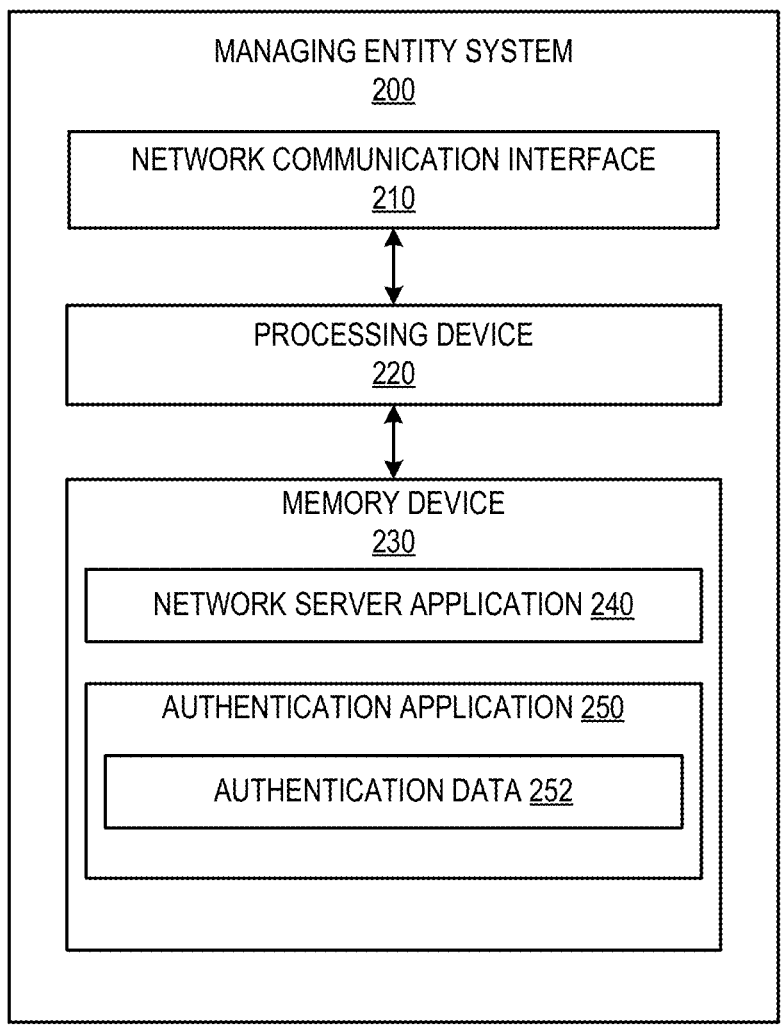
Figure 3:
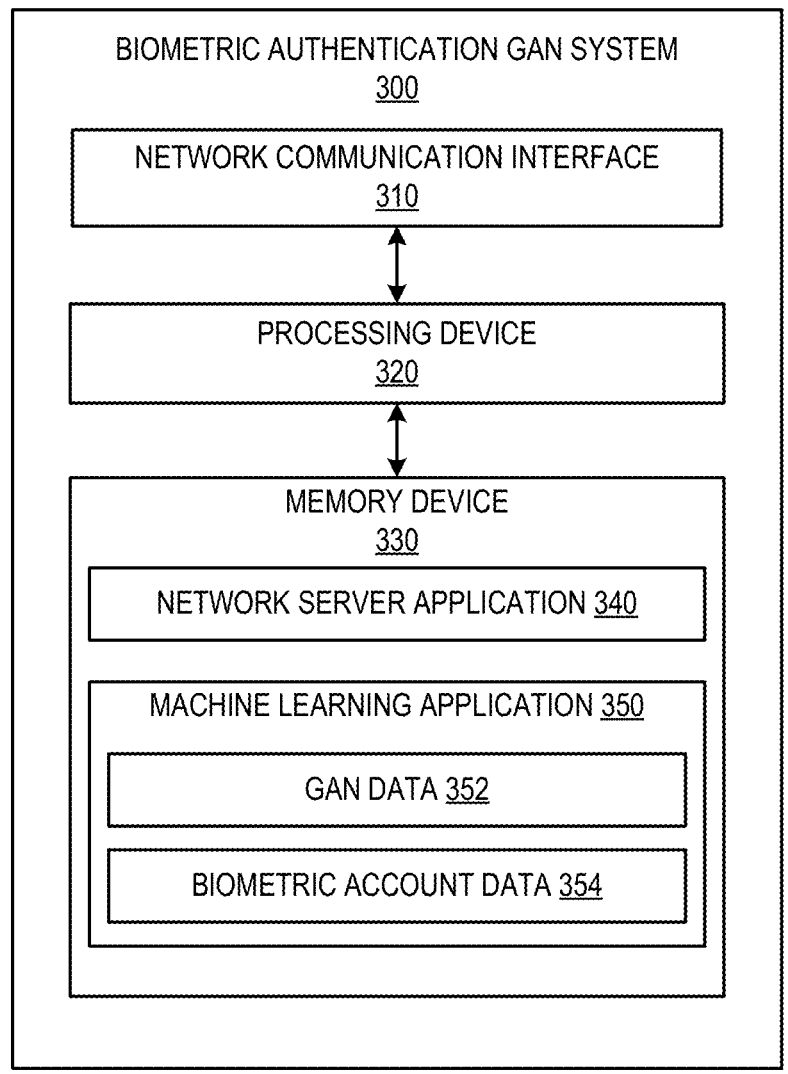
Figure 4:
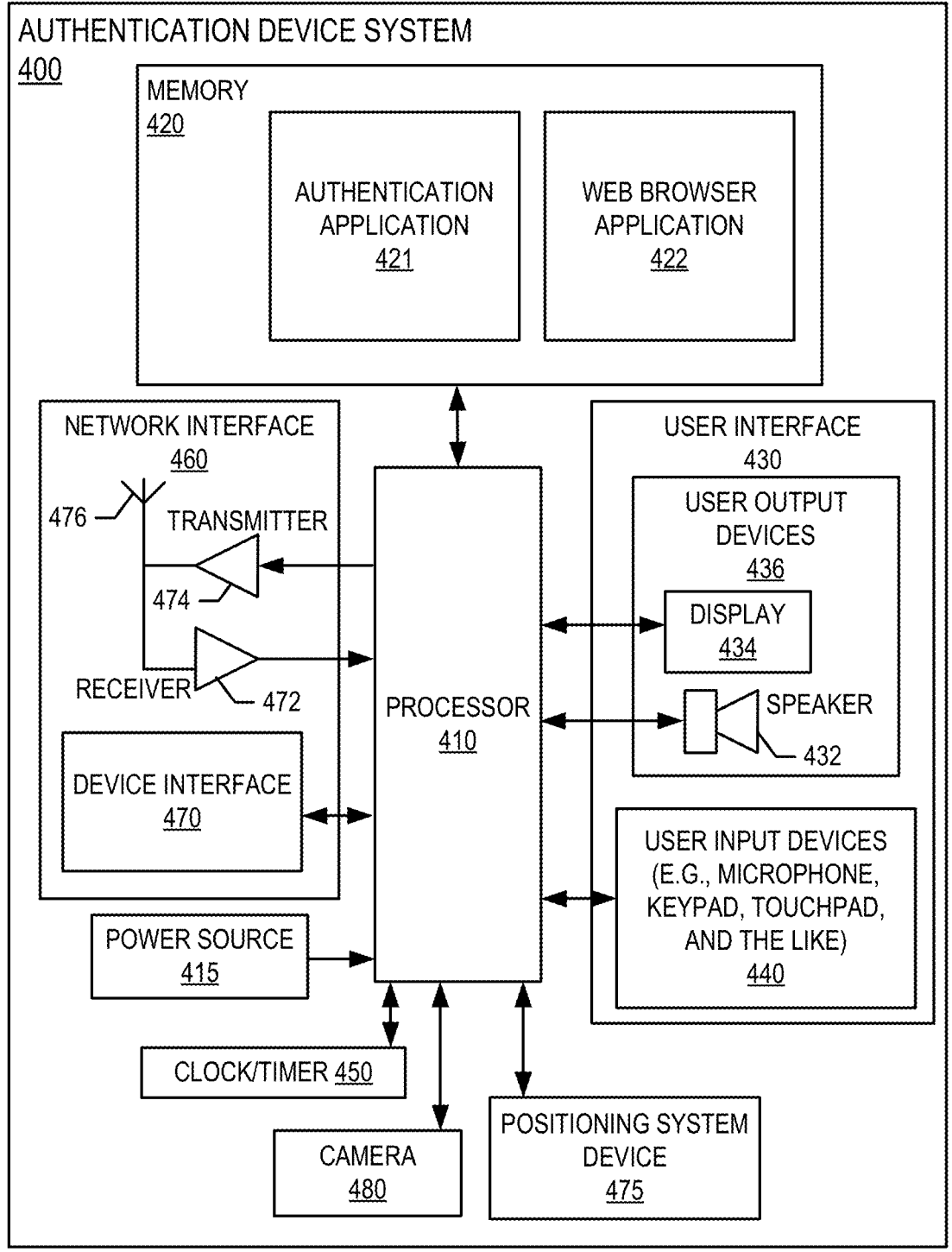
Figure 5:
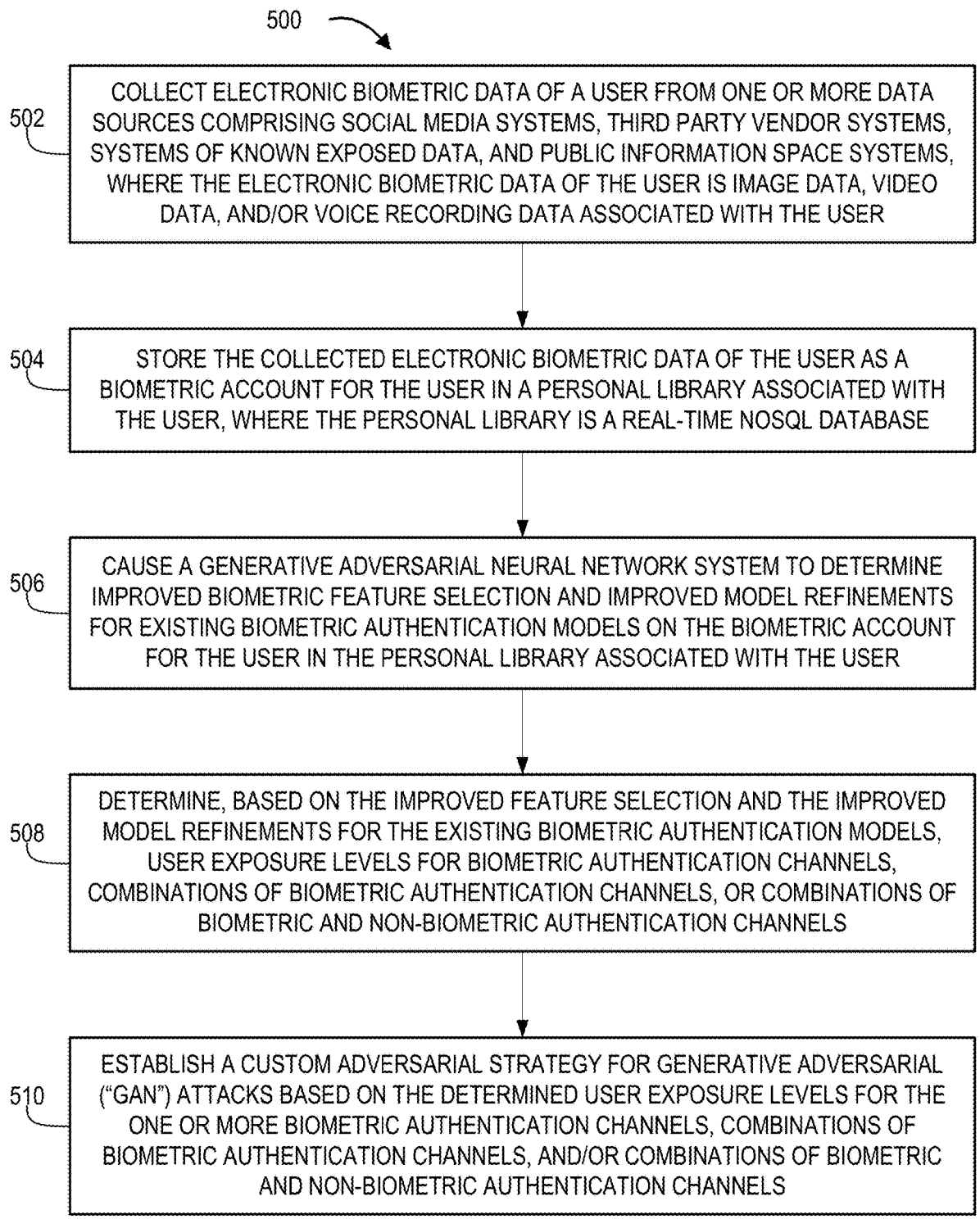
Figure 6:
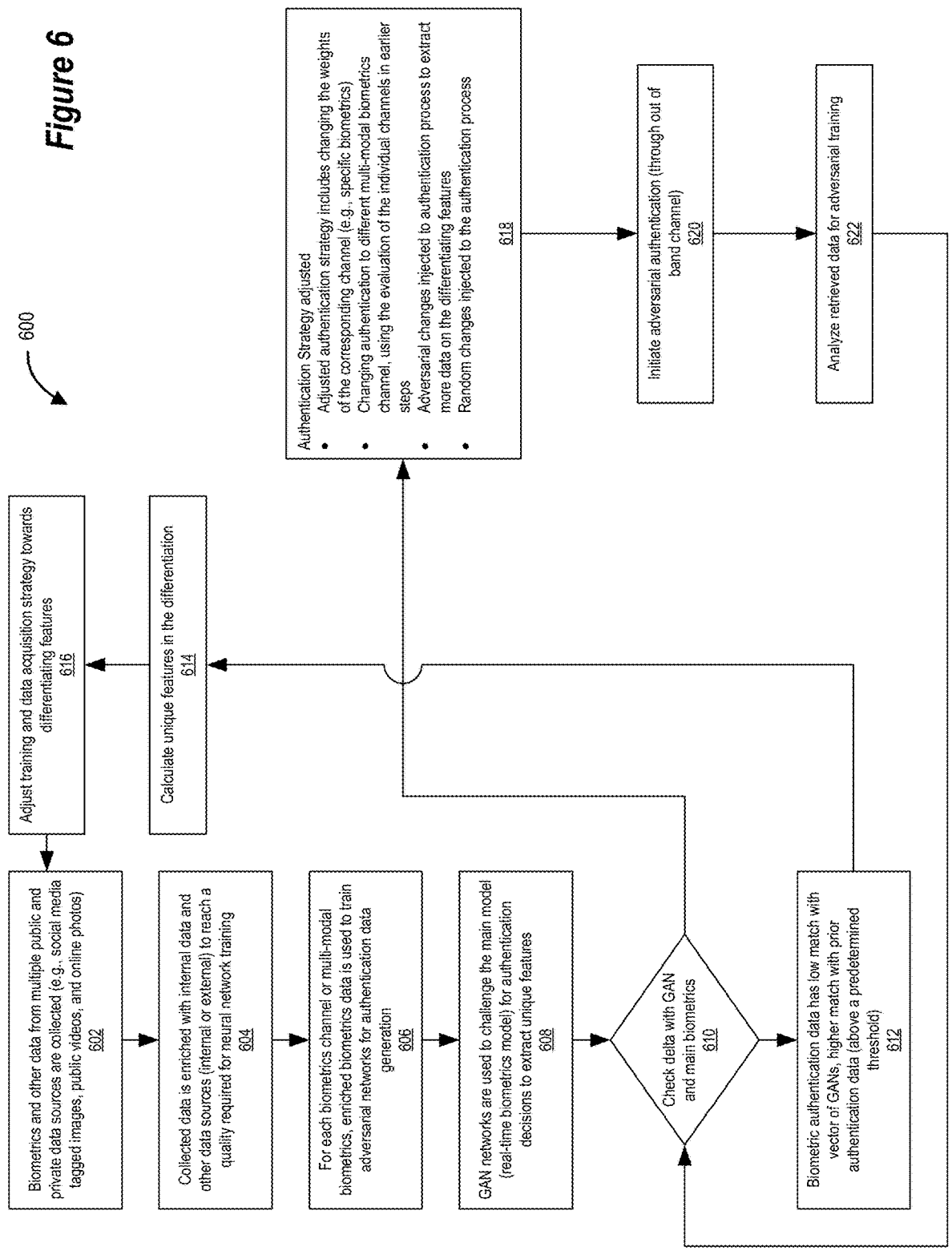
Figure 7:
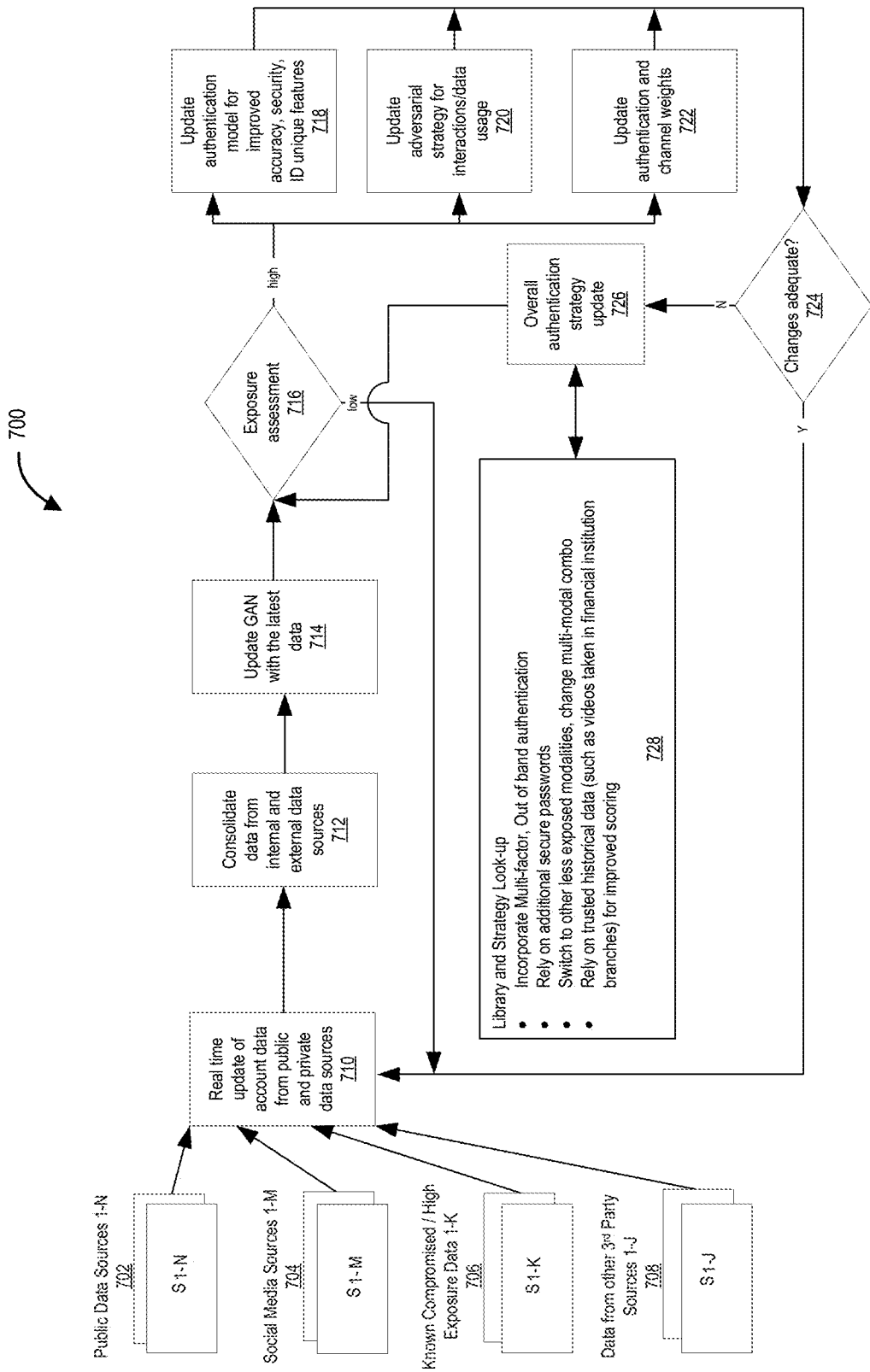

Having thus described embodiments of the invention in general terms, reference will now be made the accompanying drawings, wherein:

FIG. 1 provides a block diagram illustrating a system environment for generative adversarial network training and feature extraction for biometric authentication, in accordance with an embodiment of the invention;

FIG. 2 provides a block diagram illustrating the managing entity system of FIG. 1, in accordance with an embodiment of the invention;

FIG. 3 provides a block diagram illustrating the biometric authentication GAN system of FIG. 1, in accordance with an embodiment of the invention;

FIG. 4 provides a block diagram illustrating the authentication device system of FIG. 1, in accordance with an embodiment of the invention;

FIG. 5 provides a flowchart for adversarial network training and feature extraction for biometric authentication, in accordance with an embodiment of the invention;

FIG. 6 provides a flowchart 600 of a system for generative adversarial network training and feature extraction for biometric authentication, in accordance with an embodiment of the invention; and FIG. 7 provides a flowchart 700 that provides a description of the system for generative adversarial network training and feature extraction for biometric authentication, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

FIG. 1 provides a block diagram illustrating a system environment 100 for generative adversarial network training and feature extraction for biometric authentication, in accordance with an embodiment of the invention. As illustrated in FIG. 1, the environment 100 includes a managing entity system 200, a biometric authentication GAN system 300, one or more authentication device systems 400, biometric data source systems 120, a biometric account library 130, and one or more third party systems 140. One or more users 110 may be included in the system environment 100. In some embodiments, the user(s) 110 of the system environment 100 may be customers of a managing entity (e.g., a financial institution, an information security entity, or the like) associated with the managing entity system 200. As such, this system environment 100 may be configured to receive biometric authentication data (and non-biometric authentication data) from the user 110, via an authentication device system 400, where the managing entity system 200 determines whether the received authentication data from the user 110 aligns with known and/or generated expected traits that are unique to the user 110 by using the biometric authentication GAN system 300, the biometric data source systems 120, the biometric account library 130, and/or one or more third party systems 140.

The managing entity system 200, the biometric authentication GAN system 300, the authentication device system 400, the biometric data source systems 120, the biometric account library 130, and/or the third party system 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The managing entity system 200 may be a system owned or otherwise controlled by a managing entity to perform one or more process steps described herein. In some embodiments, the managing entity is a financial institution. In general, the managing entity system 200 is configured to communicate information or instructions with the biometric authentication GAN system 300, the authentication device system 400, the biometric data source systems 120, the biometric account library 130, and/or the third party system 140 across the network 150. For example, the managing entity system 200 may receive or extract biometric data from the biometric data source systems 120, store biometric data in the biometric account library 130, cause the biometric authentication GAN system 300 to analyze and update biometric authentication channels and strategies, and communicate with the authentication device system 400 to authenticate a user 110 based on the updated biometric authentication channels and strategies. Of course, the managing entity system 200 may be configured to perform (or instruct other systems to perform) one or more other process steps described herein. The managing entity system 200 is described in more detail with respect to FIG. 2.

The biometric authentication GAN system 300 may be a system owned or controlled by the managing entity and/or a third party that specializes in machine learning, especially utilizing deep neural network procedures, to analyze biometric information of users (including multiple biometric channels and combinations of multiple biometric channels) to identify potential areas of exposure in the authentication of the user 110. In general, the biometric authentication GAN system 300 is configured to communicate information or instructions with the managing entity system 200, the biometric data source systems 120, the biometric account library 130, the authentication device system 400, and/or the third party system 140 across the network 150. In some embodiments, the biometric authentication GAN system 300 is a stand-alone system that communicates with these other systems and databases via the network 150, but in other embodiments at least a portion of the biometric authentication GAN system 300 is a component of or otherwise controlled or managed by the managing entity system 200. The biometric authentication GAN system 300 may be configured to perform (or instruct other systems to perform) one or more other process steps described herein related to the analysis of biometric data of the user 110, analyze received biometric data of individuals purporting to be the user 110, identifying exposure levels across multiple user authentication modalities, and the like. The biometric authentication GAN system 300 is described in more detail with respect to FIG. 3.

The authentication device system 400 may be a system owned or controlled by the managing entity and/or a third party that specializes in user authentication that includes one or more channels of biometric authentication. In general, the authentication device system 400 is configured to communicate information or instructions with the managing entity system 200, the biometric authentication GAN system 300, the biometric data source systems 120, the biometric account library 130, and/or the third party system 140 across the network 150. For example, the authentication device system 400 may prompt the user 110 to provide a biometric authentication action (e.g., fingerprint scan, facial scan, facial video monitoring, gesture video monitoring, voice recording monitoring, or the like). Of course, the authentication device system 400 may be configured to perform (or instruct other systems to perform) one or more other process steps described herein. The authentication device system 400 is described in more detail with respect to FIG. 4.

The biometric data source systems 120 may comprise one or more remote or local servers or other systems that provide, acquire, aggregate, or otherwise store biometric data that can be used to generate authentication templates of biometric features of users. For example, one or more of the biometric data source systems 120 may comprise social media systems, where the associated biometric data source systems 120 have paired or otherwise linked an image, video, or voice recording (or a portion of the same) with a biometric feature (e.g., the face) of an individual (e.g., the user 110). In another example, one or more of the biometric data source systems 120 may comprise third party biometric data vendor systems that aggregate user biometric data from other institutions, directly from the users themselves, from social media sites, and the like. These third party vendor systems may additionally apply some preliminary analysis on the biometric data to clarify which data is associated with which user, or to identify a degree of confidence or strength with respect to raw biometric data points from their original sources.

The biometric data source systems 120 may additionally or alternatively include one or more databases (e.g., an internal database, a database managed by a government entity or another third party entity) of biometric data that is known to have been exposed. This biometric data that is known to have been exposed in the past may be utilized to identify when malfeasant actors are attempting to use the exposed data. Finally, in some embodiments, one or more of the biometric data source systems 120 may comprise a public information space system like the Internet, where the managing entity system 200 and/or the biometric authentication GAN system can trawl the Internet to identify additional sources of biometric data for particular individuals (e.g., the user 110). These biometric data source systems may provide the biometric data as image data, video data, voice recording data, scanning data, radar data, weight data, or the like.

The biometric account library may comprise a network communication interface, a processing device, and one or more memory devices, where the processing devices are configured to perform certain actions with the memory devices and communicate these actions to the rest of the network 150 through the network communication interface. The biometric account library 130 may include sets of biometric data (e.g., biometric data for each biometric authentication channel) for each customer (e.g., the user 110) of the managing entity system, and may include additional authentication information of the user, false biometric information of the user (e.g., biometric information that was previously presented and determined to be illegitimate), and the like.

The third party system 140 may be any system that provides any additional or supplemental actions to enable the generative adversarial network training and feature extraction for biometric authentication of the user 110.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, an authentication application 250 which includes authentication data 252. The computer-executable program code of the network server application 240 and the authentication application 250 may instruct the processing device 220 to perform certain logic, data-processing, and data-storing functions of the managing entity system 200 described herein, as well as communication functions of the managing entity system 200.

The network server application 240 and the authentication application 250 are configured to invoke or use the authentication data 252, and the like when communicating through the network communication interface 210 with the biometric authentication GAN system 300, the biometric data source systems 120, the biometric account library 130, and/or the authentication device system 400 to cause the biometric authentication GAN system to establish improved authentication parameters and/or practices and to authenticate the user 110 with the improved authentication parameters and/or practices.

FIG. 3 provides a block diagram illustrating the biometric authentication GAN system 300, in greater detail, in accordance with embodiments of the invention. As illustrated in FIG. 3, in one embodiment of the invention, the biometric authentication GAN system 300 includes one or more processing devices 320 operatively coupled to a network communication interface 310 and a memory device 330. In certain embodiments, the biometric authentication GAN system 300 is operated by a first entity, such as a financial institution, while in other embodiments, the biometric authentication GAN system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the biometric authentication GAN system 300 described herein. For example, in one embodiment of the biometric authentication GAN system 300, the memory device 330 includes, but is not limited to, a network server application 340, a machine learning application 350 which includes GAN data 352 and biometric account data 354, and other computer-executable instructions or other data. The computer-executable program code of the network server application 340 and/or the machine learning application 350 may instruct the processing device 320 to perform certain logic, data-processing, and data-storing functions of the biometric authentication GAN system 300 described herein, as well as communication functions of the biometric authentication GAN system 300.

The machine learning application 350 may be associated with a machine learning system which may include a knowledge base (e.g., the GAN data 352, the biometric account data 354, and/or the biometric data source systems 120), a set of biometric authentication analysis rules (e.g., rules based on a learning classifier system, rules based on an association rule learning system, or the like), and any other sets of data, rules, guidelines, boundaries, and any other information that can be generate models of biometric authentication data from public data and/or to test such models against known biometric data, as described herein.

This machine learning system may comprise a deep learning system like a deep neural network-based system in addition to other machine learning functions like decision trees and regression techniques. In some embodiments, this deep neural network may comprise 3, 4, or more layers, and may comprise one or more of an autoencoder, a multilayer perceptron ("MLP") a recurrent neural network ("RNN"), a convolutional deep neural network ("CNN"), a Boltzmann machine, and the like.

The network server application 340 and the machine learning application 350 are configured to invoke or use the GAN data 352, the biometric account data 354, and the like when communicating through the network communication interface 310 with the managing entity system 200, the biometric data source systems 120, the biometric account library 130, and/or the authentication device system 400 to perform one or more of the biometric authentication steps, the biometric authentication channel analysis steps, the biometric authentication modality analysis steps, biometric account generation steps, and the like.

FIG. 4 provides a block diagram illustrating a authentication device system 400 of FIG. 1 in more detail, in accordance with embodiments of the invention. In one embodiment of the invention, the authentication device system 400 is a mobile telephone. However, it should be understood that a mobile telephone is merely illustrative of one type of authentication device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, fingerprint scanners, retinal scanners, voice recording devices, motion sensing devices, scales, or any combination of the aforementioned.

Some embodiments of the authentication device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the authentication device system 400. For example, the processor 410 may include a digital signal processor device, a microprocessor device, and various analog to digital converters, digital to analog converters, and/or other support circuits. Control and signal processing functions of the authentication device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the authentication device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless network. In this regard, the authentication device system 400 may be configured to operate with one or more air interface standards, communication protocols, modulation types, and access types. By way of illustration, the authentication device system 400 may be configured to operate in accordance with any of a number of first, second, third, and/or fourth-generation communication protocols and/or the like. For example, the authentication device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The authentication device system 400 may also be configured to operate in accordance with non-cellular communication mechanisms, such as via a wireless local area network (WLAN) or other communication/data networks.

As described above, the authentication device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the authentication device system 400 to receive data from a user such as the user 110, may include any of a number of devices allowing the authentication device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The authentication device system 400 may also include a positioning system device 475 that is configured to be used by a positioning system to determine a location of the authentication device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the authentication device system 400. In other embodiments, the positioning system device 475 includes a proximity sensor or transmitter, such as an RFID tag, that can sense or be sensed by devices known to be located proximate a merchant or other location to determine that the authentication device system 400 is located proximate these known devices. The positioning system device 475 may play a crucial role in transmitting location information associated with the authentication device system 400 for determining when the authentication device system 400 is at or is in close proximity to known or expected location of a user that is being authenticated.

The authentication device system 400 further includes a power source 415, such as a battery, for powering various circuits and other devices that are used to operate the authentication device system 400. Embodiments of the authentication device system 400 may also include a clock or other timer 450 configured to determine and, in some cases, communicate actual or relative time to the processor 410 or one or more other devices.

The authentication device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the authentication device system 400 and/or one or more of the process/method steps described herein. For example, the memory 420 may include such applications as a conventional web browser application 422 and/or an authentication application 421 (or any other application provided by the managing entity system 200). These applications also typically instructions to a graphical user interface (GUI) on the display 430 that allows the user 110 to interact with the authentication device system 400, the managing entity system 200, and/or other devices or systems. In other embodiments of the invention, the user 110 interacts with the managing entity system 200 or the resource accumulation system 400 via the web browser application 422 in addition to, or instead of, the authentication application 421.

The authentication application 421 may be configured to receive instructions from the managing entity system 200 and/or the biometric authentication GAN system 300 to cause features of the authentication device system 400 to perform steps for obtaining and transmitting biometric authentication information of the user. For example, the managing entity system 200 may cause the authentication application 421 to turn on or otherwise activate the camera 480 to acquire images and/or video of an associated user, and/or to turn on or otherwise activate the a microphone of the user input devices 440 to acquire voice data associated with the associated user.

The memory 420 can also store any of a number of pieces of information, and data, used by the authentication device system 400 and the applications and devices that make up the authentication device system 400 or are in communication with the authentication device system 400 to implement the functions of the authentication device system 400 and/or the other systems described herein. For example, the memory 420 may include such data as the user's biometric data, the user's non-biometric data, and the like.

Referring now to FIG. 5, a flowchart is provided to illustrate one embodiment of a process 500 for generative adversarial network training and feature extraction for biometric authentication, in accordance with embodiments of the invention.

The process 500 described herein is configured to address, mitigate, and/or prevent certain generative adversarial network ("GAN") attacks associated with falsified biometric data. The problem is that malfeasant actors acquire public images and videos of an individual, and generate a three-dimensional model of the face (including face texture, gaze information, and the like). The modeling may comprise facial landmark extraction, three-dimensional model reconstruction, image-based texturing, and gaze correction. The malfeasant actors can also add gestures to the model (e.g., express animation), including face gestures, eye gestures (e.g., winking, blinking, looking in different directions, or the like) hand gestures, head gestures, and the like. The malfeasant actors can then try to use this generated model to pass as the individual in biometric authentication scenarios. Similarly, a malfeasant actor may utilize a GAN to create a digital copy or replica of a person with a deep fake video.

To address this challenge, this process 500 described herein provides a novel approach to prevent the biometric authentication imitation techniques by using publicly available data (e.g., the same data that malfeasant actors could use) from the Internet, social media sources, or other public data sources to build a personal biometric account library. This personal biometric account library is then used to train adversarial neural networks to build biometric models that would be similar or identical to the models created by malfeasant parties. Resulting adversarial neural networks are then used to co-train, challenge, and/or refine the biometrics neural network solutions, which may include the extraction of unique features in the associated biometrics process (e.g., by specifically zooming into the unique characteristics that have not been controlled by the generative adversarial network). The authentication strategy for the associated user may be dynamically adjusted such that the weightings of the associated features in the main biometrics engine are adjusted (e.g., randomly switching to other biometrics modality combinations, and/or adversarial interactions are initiated using out-of-band authentication with a trusted device). Custom interaction methods can be developed with the customer to minimize the exposure attacks, and login data can be evaluated based on adversarial network result similarities.

In some embodiments, the process 500 may include block 502, where the system collects electronic biometric data of a user from one or more data sources comprising social media systems, third party vendor systems, systems of known exposed data, and public information space systems, where the electronic biometric data of the user is image data, video data, and/or voice recording data associated with the user. Other examples of biometric data that can be acquired include, but are not limited to, face recognition data, retinal image data, iris data, speech pattern recognition data, gait (e.g., walking style) data, weight data, gesture data, veins of eye data, shape of hand data, shape of ears data, and the like.

In some embodiments, the process 500 includes block 504, where the system stores the collected electronic biometric data of the user as a biometric account for the user in a personal library associated with the user, where the personal library is a real-time NoSQL database.

The process 500 may include additional steps to consolidate the stored electronic biometric data of the user. As such, the system may identify, within the personal library associated with the user, one or more inconsistencies in the stored electronic biometric data of the user. The system may then remove the identified one or more inconsistencies in the stored electronic biometric data of the user from the personal library associated with the user. The system can then consolidate the stored electronic biometric data of the user within the personal library associated with the user, without the identified one or more inconsistencies.

This personal library can be dynamically updated over time and/or in real time. As such, the system may dynamically update the stored electronic biometric data of the user within the personal library associated with the user in real time in response to determining that new or adjusted electronic biometric data of the user is available from the one or more data sources.

Additionally, in some embodiments, the process 500 includes block 506, where the system causes a generative adversarial neural network system to determine improved biometric feature selection and improved model refinements for existing biometric authentication models on the biometric account for the user in the personal library associated with the user. For example, the generative adversarial neural network system may determine that the generated biometric features are not especially strong at identifying and/or replicating a few particular facial landmarks for a user, and therefore, may determine that these particular facial landmarks should carry a greater deal of weight and influence in future biometric authentication analyses.

The process 500 may also include block 508, where the system determines, based on the improved feature selection and the improved model refinements for the existing biometric authentication models, user exposure levels for biometric authentication channels, combinations of biometric authentication channels, or combinations of biometric and non-biometric authentication channels.

In some embodiments, the process 500 includes block 510, where the system establishes a custom adversarial strategy for generative adversarial ("GAN") attacks based on the determined user exposure levels for the one or more biometric authentication channel, and/or combinations of biometric and non-biometric authentication channels.

The establishment of the custom adversarial strategy for GAN attacks can be accomplished in a number of ways, including combinations of the following disclosed techniques. As a first example, the system may change establish a custom adversarial strategy to combat GAN attacks of biometric authentication by changing the existing biometric authentication models comprising improved model refinements as determined by the generative adversarial neural network system, by requiring the execution of a biometric authentication action involving traditionally or previously unexposed biometric features or scenarios.

Using the example above regarding a few particular facial landmark points, the system may adjust a biometric authentication action from simply having the user present the user's face to a camera for facial recognition, to zooming into the area(s) of the user's face with these few particular facial landmark points that have been determined to be difficult to replicate with GAN attacks.

Alternatively, the system may prompt the user to perform a gesture (e.g., smile, wink, turn head, or the like) in a manner that adjusts the few particular facial landmark points, as it has been determined that GAN attacks have difficulty in imitating these gestures. Similarly, the system may prompt the user to turn around (i.e., show the back of the head, which may not have been generated), move side to side, or otherwise significantly adjust the location of the user, as a digital imitation of the user may not be sophisticated enough to meet this biometric requirement.

Furthermore, if the system has control over the authentication device of the user and/or other features associated with the building or structure that the user is in, the system can cause a lighting change to take place (e.g., switch which lights are on, change a coloring of the lights, cause an authenticating mobile device to change a color of the display in a manner that should illuminate the user's face, or the like). In this way, the system can take steps to challenge the weakest aspects of the digital biometric imitation strategies, based on the weaknesses identified for the internally developed GAN attacks.

In another example, the system may establish the custom adversarial strategy for GAN attacks by changing the existing biometric authentication models comprising improved model refinements as determined by the generative adversarial neural network system by requiring a randomly selected authentication action involving changed biometric authentication conditions or interaction patterns. Because the GAN attacks can become more life-like through a pre-established and generated simulation (a time-consuming process), the system may randomly adjust which authentication actions should be performed by the user to authenticate the user, thereby making it unlikely or impossible for a malfeasant actor to generate a deeper imitation of the user ahead of time.

Furthermore, the system may establish a custom adversarial strategy for GAN attacks by changing weighted values of at least one of the one or more biometric authentication channels. These changed weightings of the individual biometric authentication channels may be based on determinations as to which of the individual biometric channels are the strongest, and the weakest, from the internally generated and tested GAN attack structures. For example, if the system determines that the retinal scan model generated from the publicly available information closely matches the known (e.g., private data) retinal scan information, the system may significantly decrease (or cut-out all together) the retinal scan authentication channel. However, if the system determines that the voice authentication model and the waving authentication model, as generated from the publicly available biometric data, were difficult to match with real-world or gold-standard authentication data for the user (e.g., privately acquired data), then the system may strengthen the weightings for these authentication channels for the overall authentication determination process.

Similarly, the system may change weighted values of at least one of the existing biometric authentication models comprising improved model refinements as determined by the generative adversarial neural network system. The authentication models may comprise multiple authentication channels, and therefore changing an authentication model may comprise adding a new authentication channel to the model, adjusting authentication requirements of one of the underlying authentication channels, replacing one or more of the authentication channels within the model, or the like.

In some embodiments, the system may establish the custom adversarial strategy for GAN attacks by adding one or more additional authentication methods to the existing biometric authentication models comprising improved model refinements as determined by the generative adversarial neural network system. These additional authentication methods may comprise one or more additional biometric authentication channels (e.g., adding a voice recording to a facial recognition authentication channel). However, the additional authentication method(s) may include non-biometric authentication channels as well. For example, the system may require the user, in addition to simply providing a voice sample, to speak out a randomly generated code provided to a secure computing device of the user, to speak out a password or code-word of the user, or the like. Of course, the system could also request a typed-in password as an additional authentication method. These examples are meant to be non-limiting, as any combination of biometric and/or non-biometric authentication channels can be added to improve the overall authentication process.

Similarly, the system may require a stepped up level of authentication from existing authentication models (e.g., non-biometric authentication models). For example, if the system determines that a user is exposed at a certain level for facial recognition authentication, the system may require this user to provide a facial video authentication when a facial recognition authentication is standard practice. Additionally or alternatively, the system may require the user to provide additional, more stringent, authentication credentials (e.g., a passcode or password, a two-factor authentication code, or the like).

At least a portion of the established custom adversarial strategy for GAN attacks can be based on a determination as to whether received biometric authentication data form an individual purporting to be the user matches a data pattern present within a custom database of known GAN attack data. The system may maintain a database of known GAN attacks, and the machine learning system may analyze this database to identify patterns in such GAN attacks. The system can then detect the same patterns in new biometric authentication attempts and automatically deny the authentication in response to determining the pattern match.

The system may dynamically update its biometric authentication GAN system, and the generative adversarial neural network system in particular, to identify previous biometric authentication sessions for the user from a historical user database (e.g., the biometric account library 130). The system can then evaluate received biometric authentication data of the user for each of the previous biometric authentication sessions for the user based on the custom adversarial strategy for GAN attacks to identify potential exposures from previously unknown GAN attacks.

In response to identifying a first previous biometric authentication session that is associated with a previously unknown GAN attack, the system may tag the received biometric authentication data of the user for that first previous biometric authentication session as being associated with imitability and exposure metrics.

While the process 500 of FIG. 5 is described with respect to biometric authentication channels and modalities, as well as with combinations of non-biometric authentication channels and modalities, it should be known that this type of analysis can be performed for other visioning systems or personal expression systems. For example, the system may analyze the publicly available social media feeds produced by a particular user over time and identify the information including, but not limited to sentence structuring (e.g., commonly-used grammar schemes), common spelling errors, vocabulary usage (e.g., extent of vocabulary, frequency of vocabulary), timing of social media posts, and the like.

These publicly available pieces of information can be accumulated and used to model the human interactions, expressions, and/or habits of the user within the social media. As such, the system may cause a GAN to generate hypothetical models of the user's expressions, social media posts, non-social media communications, written letters, and/or the like, and then to determine exposure values for individual elements of the generated user models. The system can then prevent any decisioning (e.g., authentication of a user, acceptance of instructions from a social media account, approvals from a social media account, agreements associated with an account, or the like).

Turning now to FIG. 6, a process 600 of a system for generative adversarial network training and feature extraction for biometric authentication, in accordance with one or more embodiments of the invention. As illustrated in FIG. 6, the process 600 may include block 602, where biometrics and other data from multiple public and private data sources are collected (e.g., social media tagged images, public videos, and online photos). As new data is scanned or otherwise received from public or private sources, this pool of data is continuously updated to provide a complete source of data in real time.

The collected data is then enriched with internal data and other data sources (internal and/or external) to reach a quality required for neural network training, as shown at block 604. The process 600 may then proceed to block 606, where enriched biometrics data is used to train adversarial networks for authentication data generation, where this training is conducted for each biometrics channel or multi-modal biometrics channel. Next, as shown at block 608, GAN networks are used to challenge the main model (e.g., the real-time biometrics model) for authentication decisions to extract unique features from the data.

As shown at block 610, the system then checks the difference (i.e., the delta) between the metrics identified through the GAN networks and the known, or main biometrics. As shown at block 610, if the biometric authentication data has a low match with the determinations of the GAN networks (i.e., a small delta), then the biometric methods or modalities are determined to have a higher match with the authentication data (or at least a matching amount that is above a predetermined threshold). As such, the process 600 may continue to block 614 where any unique features in the differentiation are calculated. As shown at block 616, the system may adjust training and data acquisition strategies towards these differentiating features.

Moving back to block 610, if the biometric authentication data is determined to have a high match with the determinations of the GAN networks, then the process 600 proceeds to block 618, where the overall authentication strategy is adjusted. The adjustment of the authentication strategy is described in some detail with respect to block 510, but some examples of adjustments to biometric and/or overall authentication strategies or modalities are provided here in block 618. For example, the system may adjust the authentication strategy for the associated user by changing the weightings of the corresponding channel (e.g., specific biometric channels like fingerprints, voice identification codes, retinal scans, or the like). In this way, the system can put a greater emphasis on specific biometric channels that have a lesser likelihood of exposure, based on the determinations of the GAN networks.

As another example, the system may change the user's authentication to different multi-modal biometrics channels, using the evaluation of the individual channels in earlier steps. In another example, adversarial changes can be injected to the authentication process to extract more data on the differentiating features such that it will be more difficult for a malfeasant to replicate the biometric features of the user.

In some embodiments, the system may simply implement random changes to the authentication process, as the random nature of these changes will be difficult or impossible for a malfeasant to predict. In such embodiments, the random changes to the authentication process may remain random for subsequent authentication processes, such that a potential malfeasant will not be able to adjust its techniques to mimic the changes to the authentication process.

Of course, other authentication strategy processes can be added to, combined with, or used instead of the described authentication adjustment strategies of block 618.

As shown at block 620, the system may initiate an adversarial authentication (e.g., through an out-of-band channel such that the data does not affect or diminish any in-bound data). The process 600 may then analyze retrieved data for adversarial training, as shown at block 620. For example, each individual cross-channel biometrics data is analyzed for exposure determination (e.g., determining an exposure value). The resulting exposure account is stored in a account of the user (e.g., within the biometric account library 130 of FIG. 1) to optimize subsequent authentication processes for this user. The machine learning system continuously learns through GAN and impersonation training with each new biometric data point recovered in the public or external private data sources.

FIG. 7 illustrates a process 700 that provides a description of the system for generative adversarial network training and feature extraction for biometric authentication, in accordance with one or more embodiments of the invention. The process 700 may begin (and continue to update in real time) by receiving, extracting, or otherwise obtaining biometric data and other authentication data of a user from a plurality of data sources which may include public data sources 702, social media sources 704, known compromised or high exposure data 706, and/or data from other third party sources 708. The process 700 continues with block 710, where the system updates the account data of the user in real time based on the public and private data sources. Next, the process 700 turns to block 712, where the system consolidates data from internal and external data sources 712. The system may then update its GAN functionality with the latest data (e.g., in real time, or near real time). Once the system has updated the GAN functionality with the latest data, the process 700 may make an exposure assessment on one or more of the biometric authentication channels of the user, based on this data, as indicated at block 716. This exposure assessment may be based on authentication model results as well as the proximity of previous authentication results as compared to the GAN results.

In embodiments where the exposure assessment determines that there is a low or insignificant concern for exposure for a particular biometric authentication feature and/or channel, the process 700 reverts back to block 710 until more account data associated with the user is obtained, such that the system continuously checks to ensure that the biometric features or authentication channels that have been determined to be associated with a low exposure remain as having low exposure. However, if the exposure assessment of block 716 determined that at least one biometric channel, authentication modality, or user account data was associated with a high exposure level (e.g., at or above a predetermined threshold value), then the process 700 would move to blocks 718, 720, and/or 722.

As shown in block 718, the system may update an authentication model for improved accuracy, security, and unique features of the identification data. As shown in block 720, the system may update an adversarial strategy for interactions and/or data usage with the user. Additionally, as shown at block 722, the system may update authentication metrics and/or channel weightings as part of the updated authentication technique.

The process 700 may then continue to block 724, where the system determines whether the changes made in blocks 718, 720, and 722 are adequate based on the known user data, the previous authentication techniques, and the exposure assessment of block 716. If the system determines that the changes are adequate, then the process 700 may return to block 710 to be tested again as new user biometric account data is received.

However, if the system determines that the changes in block 724 were not adequate, then the process 700 may proceed to block 726, where the system updates the overall authentication strategy. Examples of how the system can update the overall authentication strategy are provided at block 728, which provides a library strategy and look-up database or set of information that the system can use to update the authentication strategy. For example, the system can incorporate multi-factor, out-of-band authentication techniques to improve the authentication strategy. Additionally or alternatively, the system can rely on additional secure passwords to improve the authentication techniques. Furthermore, the system may switch its authentication channels to other, less-exposed modalities, and change the overall multi-modal combination of authentication channels to one the is less-exposed than the current modality. Additionally or alternatively, the system may rely on trusted historical data (e.g., videos taken in financial institution branches with the identity of the user being verified during, before, or immediately after the video was taken), and improving the scoring or weighting of the user's biometric data from this recording, as compared to biometric data received from other, less-trusted sources.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for improved modelling, the system comprising:
    a controller comprising one or more memory devices with computer-readable program code stored thereon, one or more communication devices connected to a network, and one or more processing devices, wherein the one or more processing devices execute the computer-readable program code to:
        collect electronic biometric data of a user from one or more data sources comprising social media systems, third party vendor systems, systems of known exposed data, and public information space systems, wherein the electronic biometric data of the user comprises at least one of image data, video data, and voice recording data associated with the user;
        store the collected electronic biometric data of the user as a biometric account for the user in a personal library associated with the user, wherein the personal library associated with the user comprises a real-time NoSQL database;
        cause a generative adversarial neural network system to determine improved biometric feature selection and improved model refinements for existing biometric authentication models based on the biometric account for the user in the personal library associated with the user;
        determine, based on the improved biometric feature selection and the improved model refinements for the existing biometric authentication models, user exposure levels for one or more biometric authentication channels, combinations of biometric authentication channels, and/or combinations of non-biometric and biometric authentication channels; and
        establish a custom adversarial strategy for generative adversarial network ("GAN") attacks based on the determined user exposure levels for the one or more biometric authentication channels, combinations of biometric authentication channels, and/or combinations of non-biometric and biometric authentication channels.

2. The system of claim 1, wherein the processing devices further execute the computer-readable program code to:
    identify, within the personal library associated with the user, one or more inconsistencies in the stored electronic biometric data of the user;
    remove the identified one or more inconsistencies in the stored electronic biometric data of the user from the personal library associated with the user; and
    consolidate the stored electronic biometric data of the user within the personal library associated with the user, without the identified one or more inconsistencies.

3. The system of claim 1, wherein the processing devices further execute the computer-readable program code to dynamically update the stored electronic biometric data of the user within the personal library associated with the user in real time in response to determining that new or adjusted electronic biometric data of the user is available from the one or more data sources.

4. The system of claim 1, wherein establishing the custom adversarial strategy for GAN attacks comprises:
    changing the existing biometric authentication models comprising improved model refinements as determined by the generative adversarial neural network system by requiring a biometric authentication action involving traditionally or previously unexposed biometric features or scenarios.

5. The system of claim 1, wherein establishing the custom adversarial strategy for GAN attacks comprises:
    changing the existing biometric authentication models comprising improved model refinements as determined by the generative adversarial neural network system by requiring a randomly selected authentication action involving changed biometric authentication conditions or interaction patterns.

6. The system of claim 1, wherein establishing the custom adversarial strategy for GAN attacks comprises:
    changing weighted values of at least one of the one or more biometric authentication channels; or
    changing weighted values of at least one of the existing biometric authentication models comprising improved model refinements as determined by the generative adversarial neural network system.

7. The system of claim 1, wherein establishing the custom adversarial strategy for GAN attacks comprises:
    adding one or more additional authentication methods to the existing biometric authentication models comprising improved model refinements as determined by the generative adversarial neural network system; or
    requiring a stepped up level of authentication from existing authentication models.

8. The system of claim 1, wherein establishing the custom adversarial strategy for GAN attacks comprises:
    determining whether received biometric authentication data from an individual purporting to be the user matches a data pattern present within a custom database of known GAN attack data.

9. The system of claim 1, wherein the processing devices further execute the computer-readable program code to:
    identify previous biometric authentication sessions for the user from a historical user database, where the previous biometric authentication sessions involved the existing biometric authentication models without the improved model refinements; and
    evaluate received biometric authentication data of the user for each of the previous biometric authentication sessions for the user based on the custom adversarial strategy for GAN attacks to identify potential exposures from previously unknown GAN attacks.

10. The system of claim 9, wherein the processing devices further execute the computer-readable program code to, in response to identifying a first previous biometric authentication session that is associated with a previously unknown GAN attack, tag the received biometric authentication data of the user for that first previous biometric authentication session as being associated with imitability and exposure metrics.

11. A computer program product for improved biometric authentication modelling, the computer program product comprising at least one non-transitory computer readable medium comprising computer readable instructions, the instructions comprising instructions for:
  collecting electronic biometric data of a user from one or more data sources comprising social media systems, third party vendor systems, systems of known exposed data, and public information space systems, wherein the electronic biometric data of the user comprises at least one of image data, video data, and voice recording data associated with the user;
  storing the collected electronic biometric data of the user as a biometric account for the user in a personal library associated with the user, wherein the personal library associated with the user comprises a real-time NoSQL database;
  causing a generative adversarial neural network system to determine improved biometric feature selection and improved model refinements for existing biometric authentication models based on the biometric account for the user in the personal library associated with the user;
  determining, based on the improved biometric feature selection and the improved model refinements for the existing biometric authentication models, user exposure levels for one or more biometric authentication channels, combinations of biometric authentication channels, and/or combinations of non-biometric and biometric authentication channels; and
  establishing a custom adversarial strategy for generative adversarial network ("GAN") attacks based on the determined user exposure levels for the one or more biometric authentication channels, combinations of biometric authentication channels, and/or combinations of non-biometric and biometric authentication channels.

12. The computer program product of claim 11, wherein the computer readable instructions further comprise instructions for:
  identifying, within the personal library associated with the user, one or more inconsistencies in the stored electronic biometric data of the user;
  removing the identified one or more inconsistencies in the stored electronic biometric data of the user from the personal library associated with the user; and
  consolidating the stored electronic biometric data of the user within the personal library associated with the user, without the identified one or more inconsistencies.

13. The computer program product of claim 11, wherein the computer readable instructions further comprise instructions for dynamically updating the stored electronic biometric data of the user within the personal library associated with the user in real time in response to determining that new or adjusted electronic biometric data of the user is available from the one or more data sources.

14. The computer program product of claim 11, wherein establishing the custom adversarial strategy for GAN attacks comprises:
  changing the existing biometric authentication models comprising improved model refinements as determined by the generative adversarial neural network system by requiring a biometric authentication action involving traditionally or previously unexposed biometric features or scenarios.

15. The computer program product of claim 11, wherein establishing the custom adversarial strategy for GAN attacks comprises:
  changing the existing biometric authentication models comprising improved model refinements as determined by the generative adversarial neural network system by requiring a randomly selected authentication action involving changed biometric authentication conditions or interaction patterns.

16. The computer program product of claim 11, wherein establishing the custom adversarial strategy for GAN attacks comprises:
  changing weighted values of at least one of the one or more biometric authentication channels; or
  changing weighted values of at least one of the existing biometric authentication models comprising improved model refinements as determined by the generative adversarial neural network system.

17. The computer program product of claim 11, wherein establishing the custom adversarial strategy for GAN attacks comprises:
  adding one or more additional authentication methods to the existing biometric authentication models comprising improved model refinements as determined by the generative adversarial neural network system; or
  requiring a stepped up level of authentication from existing authentication models.

18. The computer program product of claim 11, wherein establishing the custom adversarial strategy for GAN attacks comprises:
  determining whether received biometric authentication data from an individual purporting to be the user matches a data pattern present within a custom database of known GAN attack data.

19. A computer implemented method for improved biometric authentication modelling, said computer implemented method comprising:
  providing a computing system comprising a computer processing device and a non-transitory computer readable medium, where the computer readable medium comprises configured computer program instruction code, such that when said instruction code is operated by said computer processing device, said computer processing device performs the following operations:
  collecting electronic biometric data of a user from one or more data sources comprising social media systems, third party vendor systems, systems of known exposed data, and public information space systems, wherein the electronic biometric data of the user comprises at least one of image data, video data, and voice recording data associated with the user;
  storing the collected electronic biometric data of the user as a biometric account for the user in a personal library associated with the user, wherein the personal library associated with the user comprises a real-time NoSQL database;
  causing a generative adversarial neural network system to determine improved biometric feature selection and improved model refinements for existing biometric authentication models based on the biometric account for the user in the personal library associated with the user;
  determining, based on the improved biometric feature selection and the improved model refinements for the existing biometric authentication models, user exposure levels for one or more biometric authentication channels, combinations of biometric authentication channels, and/or combinations of non-biometric and biometric authentication channels; and establishing a custom adversarial strategy for generative adversarial network ("GAN") attacks based on the determined user exposure levels for the one or more biometric authentication channels, combinations of biometric authentication channels, and/or combinations of non-biometric and biometric authentication channels.

\* \* \* \* \*